(12) United States Patent
Wellman et al.

(10) Patent No.: US 9,606,848 B2
(45) Date of Patent: Mar. 28, 2017

(54) ITERATIVE KALMAN FILTERING

(71) Applicant: Raytheon Company, Waltham, MA (US)

(72) Inventors: William H. Wellman, Santa Barbara, CA (US); Eric J. Gudim, Goleta, CA (US); Lee M. Savage, Santa Barbara, CA (US)

(73) Assignee: Raytheon Company, Waltham, MA (US)

( * ) Notice: Subject to any disclaimer, the term of this patent is extended or adjusted under 35 U.S.C. 154(b) by 89 days.

(21) Appl. No.: 13/796,707

(22) Filed: Mar. 12, 2013

(65) Prior Publication Data
US 2014/0281779 A1 Sep. 18, 2014

(51) Int. Cl.
*G06F 11/07* (2006.01)
*G01S 5/02* (2010.01)
(Continued)

(52) U.S. Cl.
CPC ........ *G06F 11/0706* (2013.01); *G01S 5/0221* (2013.01); *G01S 5/0294* (2013.01);
(Continued)

(58) Field of Classification Search
CPC .. G06F 11/0706; G01S 5/0221; G01S 5/0294; G01S 13/003; G01S 7/285; G01S 5/06
(Continued)

(56) References Cited

U.S. PATENT DOCUMENTS

2002/0171586 A1 11/2002 Martorana et al.
2004/0233105 A1 11/2004 Benner et al.
(Continued)

OTHER PUBLICATIONS

Kutty et al.; "Kalman Filter Using Quantile based Noise Estimation for Audio Restoration"; IEEE International Conference on Emerging Trends in Electrical and Computer Technology; Bangalore University; (2011).
Park et al.; "Dead Reckoning Navigation of a Mobile Robot Using an Indirect Kalman Filter"; IEEE International Conference on Multisensor Fusion and Integration for Intelligent Systems; (1996).
Shehata et al.; "Joint Iterative Detection and Phase Noise Estimation Algorithms Using Kalman Filtering"; IEEE; (2009).
(Continued)

*Primary Examiner* — Albert Decady
*Assistant Examiner* — Kyle Vallecillo
(74) *Attorney, Agent, or Firm* — Burns & Levinson LLP; Joseph M. Maraia

(57) ABSTRACT

Several types of noise limit the performance of remote sensing systems, e.g., systems that determine the location, color, or shape of remote objects. When noise detected by sensors of the remote sensing systems is known and well estimated, a Kalman filter can converge on an accurate value without noise. However, non-Gaussian noise bursts can cause the Kalman filter to diverge from an accurate value. Current approaches arbitrarily boost noise with fixed additive or multiplicative factors, which slows filter response and often fails to give timely results. Such noise boosts prevent divergence due to badly corrupted measurements. Disclosed embodiments eliminate a subset of noise measurements having the largest errors from a data set of noise measurements and process the remaining data through the Kalman filter. Advantageously, disclosed embodiments enable a Kalman filter to converge on an accurate value without the introduction of noise boost estimates.

9 Claims, 7 Drawing Sheets

(51) Int. Cl.
  *G01S 5/06* (2006.01)
  *G01S 7/285* (2006.01)
  *G01S 13/00* (2006.01)

(52) U.S. Cl.
  CPC ............... *G01S 5/06* (2013.01); *G01S 7/285* (2013.01); *G01S 13/003* (2013.01)

(58) Field of Classification Search
  USPC ........ 714/774; 701/3, 213, 214; 342/357.02, 342/386
  See application file for complete search history.

(56) References Cited

U.S. PATENT DOCUMENTS

| | | | |
|---|---|---|---|
| 2007/0118286 A1* | 5/2007 | Wang et al. | 701/213 |
| 2007/0194984 A1* | 8/2007 | Waid | 342/357.02 |
| 2010/0315290 A1* | 12/2010 | Grabbe | 342/386 |
| 2011/0090116 A1 | 4/2011 | Hatch et al. | |

OTHER PUBLICATIONS

Sibley et al.; "The Iterated Sigma Point Kalman Filter with Applications to Long Range Stereo"; Robotics: Science and Systems; (2006).

Terejanu; "Extended Kalman Filter Tutorial"; Web-Tutorial, Department of Computer Science and Engineering, U. Buffalo (Jul. 5, 2006).

Trigo; "Iterated Extended Kalman Filter With Adaptive State Noise Estimation for Electrical Impedance Tomography"; Technology Meets Surgery International (2005).

Verlaan; "Iterated Kalman Filter Using Ensembles"; pp. 1-22, Delft University (2009).

Welch et al.; "An Introduction to the Kalman Filter"; UNC at Chapel Hill (2006).

Zhang; "Iterated Extended Kalman Filter"; Research Microsoft; (1996).

* cited by examiner

ITERATIVE KALMAN FILTERING

GOVERNMENT SUPPORT

This disclosure was supported, in whole or in part, by Contract No. N68936-05-D-0033 awarded by the Naval Air Warfare Center Weapons Division. The Government may have certain rights in the disclosure.

BACKGROUND

A Kalman filter solves the general problem of estimating true values of variables/states of a linear dynamic system that is perturbed by white noise. It is a key method for improving the accuracy for complex measurement and control systems. Unlike filter designs that are optimized for specific signal and noise frequency spectral characteristics, the Kalman filter constantly adapts to noise in the system measurements and its changes from moment to moment.

The Kalman filter is also known as a linear quadratic estimator (LQE). It is an algorithm that uses a series of input measurements acquired over time. The measurements contain noise (random variations in the measurements) and other errors, and the filter generates estimates of unknown system variables/states that tend to be more precise than those that would be based on a single measurement alone.

The Kalman Filter also solves what are called inversion problems, in which a tentative solution is improved incrementally by comparing sensor inputs with estimates of the input that would be expected from the tentative solution and input data. The Kalman filter has numerous applications in technology. A common application is for guidance, navigation and control of vehicles, particularly aircraft and spacecraft.

SUMMARY

An embodiment of the present disclosure is a method, system, or computer readable medium, with program codes embodied thereon, for improving a Kalman filter solution. The embodiment receives a plurality of sequential measurements of a state variable. Each measurement of the sequential measurements includes a respective noise contribution. The embodiment also obtains, for each measurement of the plurality of sequential measurements, a Kalman-filtered estimate of the state variable. For each Kalman-filtered estimate, the embodiment determines a respective error indicative of a departure of the Kalman-filtered estimate from the state variable. In addition, the embodiment selectively removes at least one sequential measurement from the plurality of sequential measurements responsive to a predetermined condition imposed upon the respective errors. The sequential measurements that are remaining after removal are referred to as a tailored plurality of sequential measurements. For each measurement of the tailored plurality of sequential measurements, the embodiment obtains a Kalman-filtered estimate for the state variable.

In an example, the state variable can be a prior convergent Kalman filter estimate of the state variable. Also, the aforementioned predetermined condition can comprise a comparison of each respective error to an error threshold. In addition, the predetermined condition can include removing a number of sensor measurements having the greatest error, where the number of removed measurements corresponds to a predetermined ratio. For instance, the predetermined condition imposed upon the respective errors can comprise a predetermined ratio of the measurements having the greatest error.

After obtaining a Kalman-filtered estimate for the state variable, the embodiment, utilizing the remaining sequential measurements, can again determine for each Kalman-filtered estimate a respective error indicative of a departure from the Kalman-filtered estimate from the state variable. Also, the embodiment can again selectively remove at least one sequential measurement from the plurality of sequential measurements responsive to a predetermined condition imposed upon the respective errors. For each measurement of the tailored plurality of sequential measurements, the embodiment can again obtain a Kalman-filtered estimate for the state variable.

The embodiment can determine a respective error indicative of a departure of the Kalman-filtered result from the state variable by comparing the Kalman-filtered result to a final result of a prior Kalman-filtered solution. In addition, the embodiment can determine a respective error indicative of a departure of the Kalman-filtered result from the state variable by comparing the Kalman-filtered result to an average of a plurality of results of a prior Kalman-filtered solution.

Further, the embodiment, utilizing the remaining sequential measurements, can again determine for each Kalman-filtered estimate a respective error indicative of a departure from the Kalman-filtered estimate from the state variable. Also, the embodiment can again selectively remove at least one sequential measurement from the plurality of sequential measurements responsive to a predetermined condition imposed upon the respective errors. For each measurement of the tailored plurality of sequential measurements, the embodiment can again obtain a Kalman-filtered estimate for the state variable.

In one example, receiving the plurality of sequential measurements of a state variable can include receiving frequency difference of arrival (FDOA) obtained from at least two spaced apart sensors. The embodiment can then determine a location (e.g., of a fixed object) responsive to the received FDOA. In another example, receiving the plurality of sequential measurements of a state variable can include receiving time difference of arrival (TDOA) obtained from at least two spaced apart sensors. The embodiment can then determine a location responsive to the received TDOA.

The improved Kalman filter methods and systems described herein (hereinafter "technology") can provide one or more of the following advantages. For instance, the technology enables a Kalman filter to converge on an accurate value when noise cannot be measured well. In particular, the technology converges on an accurate value without the introduction of artificial noise boost estimates, which creates stability but adds processing time and also can add additional sources of error. Another advantage is that by removing measurements with the largest errors from a data set of measurements, the technology provides a more accurate estimate of the location, color, or shape of objects remote from a platform utilizing a sensor(s) to detect the objects.

It should be understood that embodiments of the present disclosure can be implemented in the form of a method, system, apparatus, or computer readable medium with program codes embodied thereon, for improving a Kalman filter solution. For ease of reading, the term "system" is used in various portions of the description and may represent some or all forms of embodiments and implementations of the present disclosure, such as systems, method, apparatuses, devices, computer readable media, network nodes, and networks.

BRIEF DESCRIPTION OF THE DRAWINGS

The foregoing will be apparent from the following more particular description of example embodiments of the disclosure, as illustrated in the accompanying drawings in which like reference characters refer to the same parts throughout the different views. The drawings are not necessarily to scale, emphasis instead being placed upon illustrating embodiments of the present disclosure.

DETAILED DESCRIPTION

Accurate remote tracking of fixed objects from a moving platform (e.g., a plane) requires overcoming noise because noise limits the performance of remote sensing systems (e.g., systems that determine the location, color, or shape of remote objects). When noise (e.g., all noise sources) is known, Kalman filtering can converge on an accurate value (e.g., sensed data without noise). However, Kalman filtering fails when noise is erratic and not well predicted. For instance, Kalman theory is based on filtering data when noise has Gaussian statistics, which means large noise values are infrequent. Thus, unexpected noise bursts can cause the Kalman filter to diverge from an accurate value.

In one example, noise bursts can occur due to sensor(s) of the signal-sensing system experiencing non-measured angular movements. For instance, the sensor(s) can experience such movement due to airframe vibrations and flexing of a moving platform to which the sensor(s) is coupled. Such movement introduces unanticipated noise when platform motion is measured at a different location on the platform than the location of the sensor(s) on the platform. In another example, noise bursts can also occur due to erratic behavior of the sensor(s) equipment. Thus, in such conditions where noise is unanticipated, tracking accuracy using Kalman filtering is severely compromised.

In order to mitigate the effect of unanticipated noise, some current approaches arbitrarily boost anticipated/measured noise with fixed additive or multiplicative factors. Arbitrarily boosting noise with fixed additive or multiplicative factors can improve Kalman accuracy by reducing response to the noisy data samples. However, such boosting slows filter response to all data samples. Thus, large noise boosts fail to give timely results. Further, such fixed noise boosts also fail to prevent divergence in Kalman estimation due to badly corrupted outlier measurements or when the fixed noise boost is too small to adequately suppress spurious response to very erratic data.

Figure 1:
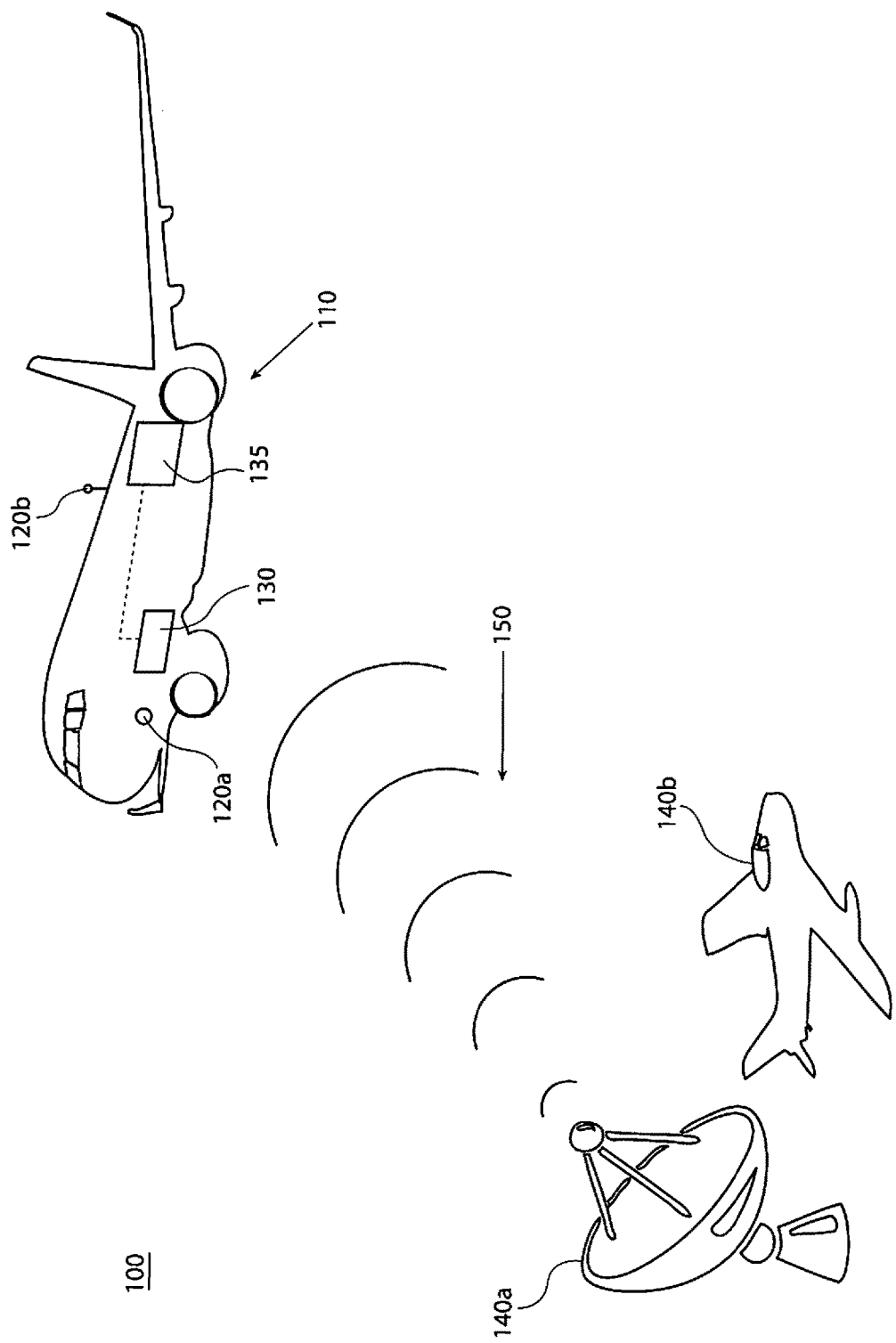
FIG. 1 is a schematic illustration of an environment in which a mobile platform (e.g., a plane) remotely tracks an object (e.g., a remote emitter) via a location detector in accordance with an example embodiment of the present disclosure.

FIG. 1 is a schematic illustration of an environment 100 in which a mobile platform (e.g., a plane) 110 remotely tracks a fixed object (e.g., a remote emitter) 140a or a moving object 140b (e.g., an aircraft or other moving remote emitter) using a location detector 135. As illustrated, the environment 100 includes a mobile platform 110 that can optionally include a motion sensing device (e.g., an inertial navigation system 130). The mobile platform receives (e.g., measures) emissions 150 via at least one of the sensors 120a-b from the remote emitter 140a or moving object 140b. As an example, tracking of the fixed object 140a or moving object 140b can be utilized in weapon targeting systems in order to locate and track targets. As another example, tracking of a remote emitter 140a (e.g., rescue beacon, surveillance radar, cell phone, or tracking radar) can be utilized in order to facilitate search and rescue missions that require an accurate indication of the location of the remote emitter 140a. In another example, tracking of the moving object 140b (e.g., an aircraft or missile) can be utilized in order to facilitate locating and destroying the moving object 140b.

In some embodiments, the emitter 140a can be sonic, as would be used by a sonar system. In other embodiments, the remote emitter 140a can be a reflector as used by a semi active radar or ladar system that includes a transmitter. It should be noted that the presence or absence of a transmitter is inconsequential to the principles of the present disclosure and needs no special discussion. In yet other embodiments, the remote emitter 140a can be a reflector that is illuminated by a radar or ladar transmitter on a different platform, and detected by passive sensor 140. In these embodiments, the sensors 120a-b can be passive sensors that receive radiation but do not transmit radiation. Passive sensing has advantages of simplicity, clandestine operation, low power needs, and also can be implemented with only software changes to existing radar warning receiver equipment or other similar surveillance equipment.

Although the mobile platform 110 is illustrated as a plane, the mobile platform can be any type of a mobile vehicle (e.g., land-based, air-based, or sea-based). The remote emitter 140a can be an antenna that transmits RF signals, which is the usual case. However, the remote emitter 140a can also be a reflector that is illuminated by a transmitter of an active radar or lidar system.

It should also be noted that, while two sensors 120a-b are depicted, a single sensor or three or more sensors can be employed.

Figure 2:
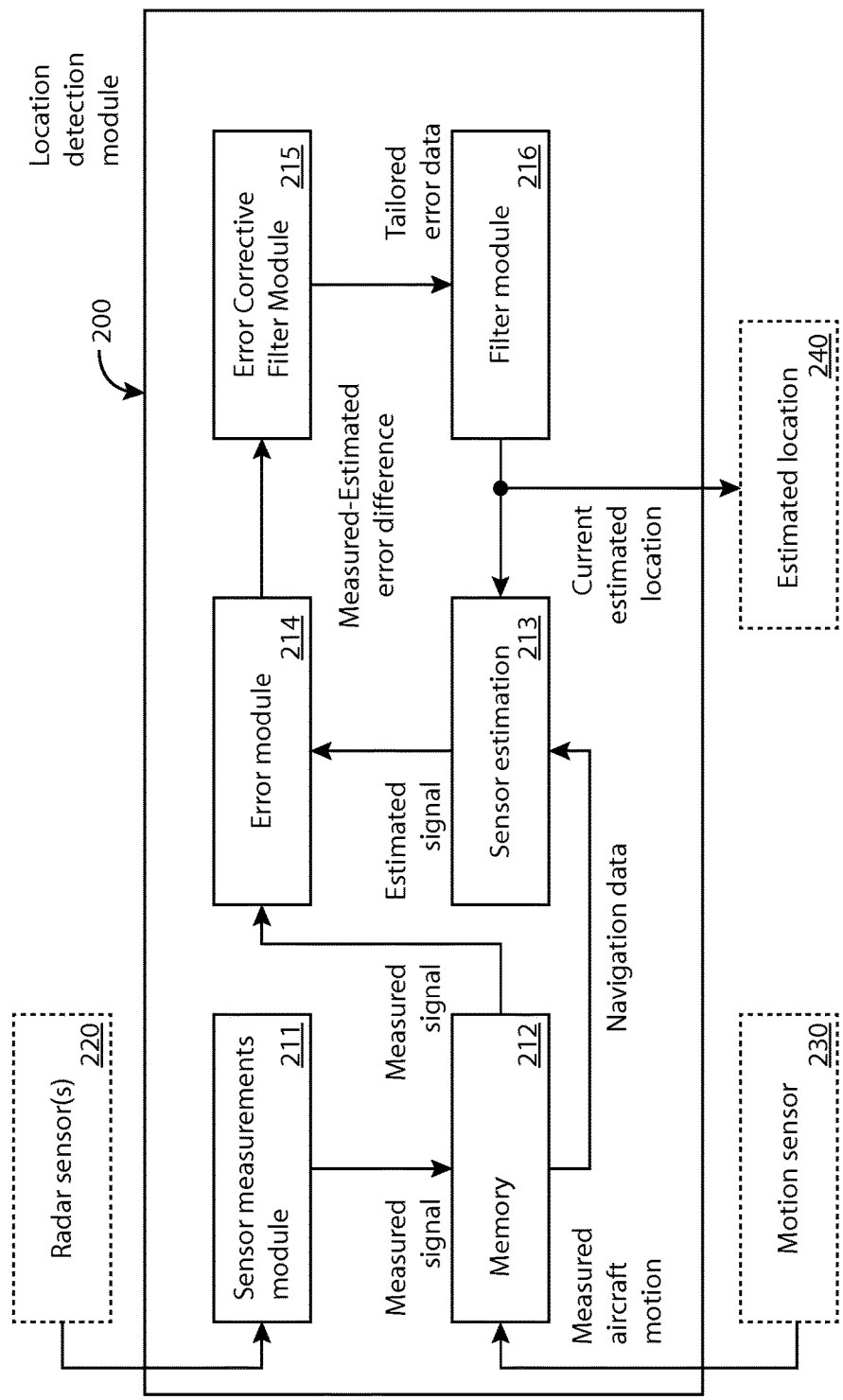
FIG. 2 is a block diagram of a location detection module in accordance with an example embodiment of the present disclosure.

FIG. 2 is a block diagram of a location detection module 200 implemented by a location detector (e.g., the location detector 135 of FIG. 1). The location detection module 200 receives data from sensor(s) 220 and, optionally, motion sensor inertial navigation system 230 (e.g., inertial navigation system). In order to process the received data, the location detection module 200 utilizes a sensor measurement module (211), memory (212), error calculation module (214), error corrective filter module 215, sensor estimation module (213), and filter module (216).

For example, in an environment (e.g., environment 100 of FIG. 1), sensor(s) 220 (e.g., sensors 120a-b of FIG. 1)

receive a respective plurality of sequential sensor input samples (e.g., RF signals) from a remote emitter (e.g., the remote emitter 140a and/or moving object 140b of FIG. 1). Each sensor input sample is indicative of a respective emission 150 from the remote emitter at various times. The sensors 220 also receive input samples from other sources of noise as described herein. A processor (e.g., processor 620 of FIG. 6, and location detector module 200 of FIG. 2) coupled to the sensors 220 receives the samples and calculates, for example, an average or least-mean-square function fit to the time varying data. In addition, the processor calculates a variance about this average. The calculated data provides a respective indication of sensor noise. For instance, the average value may correspond to the sensor input samples from the remote emitter, while the variance may be associated with the input samples from other sources of noise.

The sensor measurements module 211 receives, for at least one of the sensors 220, successive indications of measured sensor signal and sensor noise. The sensor measurements module 211 processes the measured signal as described herein. This series of sensor measurements then are passed to memory module 212. Similarly, motion sensor module (e.g., an inertial navigation system) 230 passes aircraft motion measurements to memory module 212. Sensor estimation module 213 retrieves the aircraft motion data from memory module 212, and combines it in geometric calculations with the current estimated location from filter module 216, to calculate an estimated signal. Error module 214 analyzes the difference between these measured and estimated signals and produces a series of error inputs that are passed through error corrective filter module 215, which eliminates erratic or outlier data. The edited error data from the error corrective filter module 215 then is passed to filter module 216. The filter module 216 applies geometric calculations to the edited error data result in an estimated emitter location 240.

As stated above, memory 212 records measurements received from sensor measurements module 211 and the motion sensor module 230. The measurements include aircraft motion and sensor signals as observed over time. As described herein, at each point in time, the measured signal typically is reduced to a simplified parameter such as time-difference-of-arrival (TDOA), to avoid recording the voluminous data from time waveforms. This is done with complex calculations and, as such, desirably would be done only one time. Thus, storing the calculation results reduces processing workload when calculations are iterated. One principle of an embodiment of the present disclosure is the reuse of measured data, which is simplified by recording the results of calculations wherever possible, rather than the data input to calculations.

As stated above, the sensor measurements module 211 processes the sequential sensor input samples. Based on processing of the sequential sensor input samples (e.g., RF signals) from the remote emitter, the sensor measurements module 211 determines a plurality of sequential measurements of a state variable (e.g., location of the remote emitter). In one example, the sensor measurements module 211 determines frequency-difference-of arrival (FDOA) by measuring differential Doppler phase rate between signals received by a pair of sensors (e.g., the sensors 120a-b of FIG. 1). In another example, the sensor measurements module 211 determines a time difference of arrival (TDOA) between signals received by the sensors 220. In yet another example, sensor measurements module 211 determines both FDOA and TDOA as two measures of the same waveform.

As stated above, location determination may be based on differential Doppler rates. For instance, aircraft (e.g., mobile platform 110 of FIG. 1) motion maneuvers give rise to differential velocities or differential distances along a sightline to the remote emitter. Signals from two or more sensors are processed coherently in pairs to extract precise bearing and range to the remote emitter. Also, signals from one sensor can be processed to yield a precise closing velocity.

For this typical geolocation embodiment, a remote emitter signal (e.g., signal 150 of FIG. 1) is received through two antennas (e.g., the sensors 120a-b of FIG. 1) separated by a certain baseline distance (e.g., 'd') by the sensor measurement module 211. As the aircraft rotates through an angle rate about an axis perpendicular to the plane defined by the two antennas and the remote emitter, an angular rate $d\Omega/dt$, causes a velocity of the baseline between port and aft antenna (e.g., sensors 120a-b respectively) to have a rotational or angular velocity of $V_{ROTATION} = d\Omega/dt \cdot d/2$, where d is the separation of the antennas perpendicular to the line-of-sight to the remote emitter. The forward fuselage antenna (e.g., sensor 120a of FIG. 1) has a velocity that is in the opposite direction (i.e., the velocity has the same value but opposite sign). Thus, the difference in velocity is $2 \cdot V_{ROTATION}$, or $d \cdot d\Omega/dt$. It should be noted that the aircraft linear velocity, for example, $V_{TRANSLATION}$, cancels in the difference velocity calculation, so the resultant FDOA signal accurately represents a turning rate of the baseline as sensed by a radar. Differential measurements are performed by the sensor measurements module 211 in order to cancel common-mode noises and improve accuracy. The FDOA is compared with an FDOA calculated from an estimated emitter location and the motion measured by a physical motion sensor by the error module 214 as described herein; the difference between measured and estimated FDOA then is used with the error corrective filter 215 and the filter module 216 to improve the remote emitter location estimate 240. Sensor measurements module 211 may form the desired measurements of each emitter pulse burst by smoothing individual measurements made on each individual pulse of the pulse set or burst.

FDOA may be calculated as the time derivative of TDOA, as a measure of the different phase rate of change between the two antenna signals that results from Doppler shifts due to the velocities projected in the direction to the emitter. This differential velocity can be decomposed into rotational and translational components. The rotational component depends on aircraft turning rate, and is effective at all ranges. The translational component depends on the emitter angle between the antennas, and can be significant at close range. The FDOA measurement establishes the angular turning rates of the line of sight, relative to the changing aircraft orientation In another embodiment, time-difference-of-arrival (TDOA) measurements are performed by sensor measurement module 211. TDOA may be measured for individual pulses, and is made more accurate by combining pulses over a dwell. Further processing uses TDOA to eliminate the effect of cable-length propagation delays. The TDOA measurement establishes the angular portion of the emitter in aircraft coordinates.

Depending on rates and position of aircraft, sensor measurements module 211 computes measured FDOA and/or TDOA signals, which are recorded in memory 212. Also, rate and position information from the motion sensor 230 (e.g., an aircraft inertial navigation system (INS)) is recorded in memory 212. For each sample time, the FDOA estimate at each observation (i.e., data sample) corresponds to a curved line of possible emitter locations on the surface of the Earth. As the aircraft maneuvers and traverses its flight path, the orientation of successive lines change, and ideally intersect at a common point where the emitter is located. The same is true for TDOA. A combined measure of FDOA and TDOA produces two such lines for each observation, and for each measurement these lines ideally intersect at the point where the emitter is located. In all cases, data smoothing by error corrective filter module 215 suppresses noise effects, and gives a best estimate of emitter location.

For each sensor input sample, the sensor estimation module 213 calculates an estimate of the output that should be generated by the sensor measurements module 211 (e.g., based on a current estimated location of the remote emitter) and recorded in memory 212. In an example, the (e.g., inertial navigation system) provides a measurement of platform motion (e.g., motion of a plane (mobile platform)) to the sensor output estimator 213 via memory 212. This enables editing based on signals that would occur if a true location of the emitter is equivalent to the current estimated location of the emitter. Due to the noise that is not edited out or the incomplete convergence to an accurate solution (as described herein), the estimated location of the remote emitter is not fully accurate. Nonetheless, the current estimated location of the remote emitter is used as a "pseudo truth" basis for determining a true location of the remote emitter. The sensor estimation module 213 receives the navigation data and calculates an estimate of the output of the sensor measurements module 211. The sensor estimation module 213 calculates the estimate by calculating differential changes in path length from the remote emitter to each of the sensor(s) 220 based on a current estimated location of the remote emitter. In particular, the sensor estimation module 213 receives the current estimate location of the remote emitter from the filter module 240, (e.g., a Kalman filter least-mean-square filter or other error-minimizing computational filters). This estimated error will change as the estimated location 240 changes, thereby changing the estimated signal from sensor estimation module 213. Measured signal and measured aircraft motion are taken from memory 212. Such measured data does not change. Error module 214 generates the difference between the measured and estimated signals. This difference is caused by noise in the measured values, as well as by incorrect estimates of the estimated location 240. Filter module 216 acts to minimize the error from both those sources, thereby making the estimated location 240 more accurate. The error corrective module 215 is interposed to remove "outlier" data that otherwise would impede convergence of the filter 216 on an accurate estimated location.

The process described is initiated with a value for the estimated location 240 that typically is very inaccurate. Simply iterating this process with the same data can improve accuracy, but is not reliable if the data does not have simple Gaussian noise. The current iteration process with outlier editing makes iteration robust against more typical data, which may not have Gaussian statistics. For example, aircraft motion may be erratic due to turbulence or to jolts in motion of control surfaces; the measured signals may be erratic due to spurious multipath reflections or blockage effects. Tailoring of data by the error corrective module 215 makes solutions robust, and also speeds convergence. Tailoring is done by comparing measured signal against an estimated signal that is derived from a current estimated location 240. This process can be repeated multiple times using the same recorded data, but with the estimated signal samples that result due to changes in the estimated location 240.

As stated herein, motions of the mobile platform (e.g., mobile platform 110 of FIG. 1) at the sensors 220 introduce unanticipated noise bursts. In particular, motions at higher frequencies where airframe flexure and resonance become significant introduce such unanticipated noise bursts. Thus, in some situations, sensors 220 can provide the sensor measurements module 211 with unknown and/or unanticipated noise measurements in addition to the plurality of sequential sensor input samples (e.g., RF signals) from the remote emitter. For example, the sensors 220 can detect noise bursts due to non-measured angular movements of the mobile platform at the sensor(s) 220. Such noise bursts typically occur when an aircraft experiences turbulent shock or vibrations. Noise bursts can also occur due to erratic behavior from the sensors 220 or other sensor equipment (not shown).

Such noise bursts prevent the location detection module 200 from converging on an accurate location of the remote emitter because the noise bursts introduce erroneous data that is provided to the sensor measurements module 211 or sensor estimation module 213. In an example, the location detection module 200 mitigates the effect of such erroneous data by utilizing the error corrective filter module 215, which uses algorithms and statistical analysis to block "outlier" data from being applied to the filter module 216.

For example, the error module 214 then passes the determined respective error for each calculated filtered estimate of the location of the remote emitter to the error corrective filter module 215. Since momentary large errors tend to indicate faulty measurements, and more steady errors tend to indicate of an error in estimated location, eliminating the extreme errors with the error corrective filter 215 is effective in improving the results of an iterated calculation.

The error corrective filter 215 then selectively removes at least one sequential measurement from the plurality of sequential measurements responsive to a predetermined condition imposed upon the respective errors. In one example, the error corrective filter 215 compares each respective error to an error threshold. The error threshold, for example, is a predetermined maximum allowable difference between the non-filtered and filtered estimate of the location of the remote emitter. The error corrective filter 215 then removes those sequential measurements associated with errors that are greater than the error threshold. In another example, the predetermined condition imposed upon the respective errors includes a predetermined ratio of the sequential measurements having the greatest error. For instance, the location detector 135 selectively removes an X % (e.g., 5%, 10%, and 25%) of the measurements having the greatest respective errors. In an example, the percent of measurements to be removed is determined based on the number of measurements. For example, for less than 50 measurements, 5% of the measurements are removed; for measurements between 50 and 100, 10% of the measurements are removed; and for measurements greater than 100 25% of the measurements are removed.

The remaining sensor measurements (e.g., tailored sequential measurements) are then input to the filter module 216 via the error corrective filter module 215, which then determines a revised filtered estimate of the location of the remote emitter.

In one example, the location detection module 200 then iteratively obtains further filtered estimates of the state variable. In one embodiment, the error corrective filter 215 removes a subset of the remaining measurements associated with an error greater than a second predetermined threshold error. In another embodiment, the error corrective filter 215 removes a percentage (e.g., 5%, 10%, and 25%) of the remaining measurements having the greatest error. The filter module 216 then obtains a Kalman-filtered estimate of the state variable (e.g., location) for each of the remaining measurements. In addition, a limit may be placed on the number of iterations, to avoid pointless calculations when data is extremely erratic.

Figure 3A:
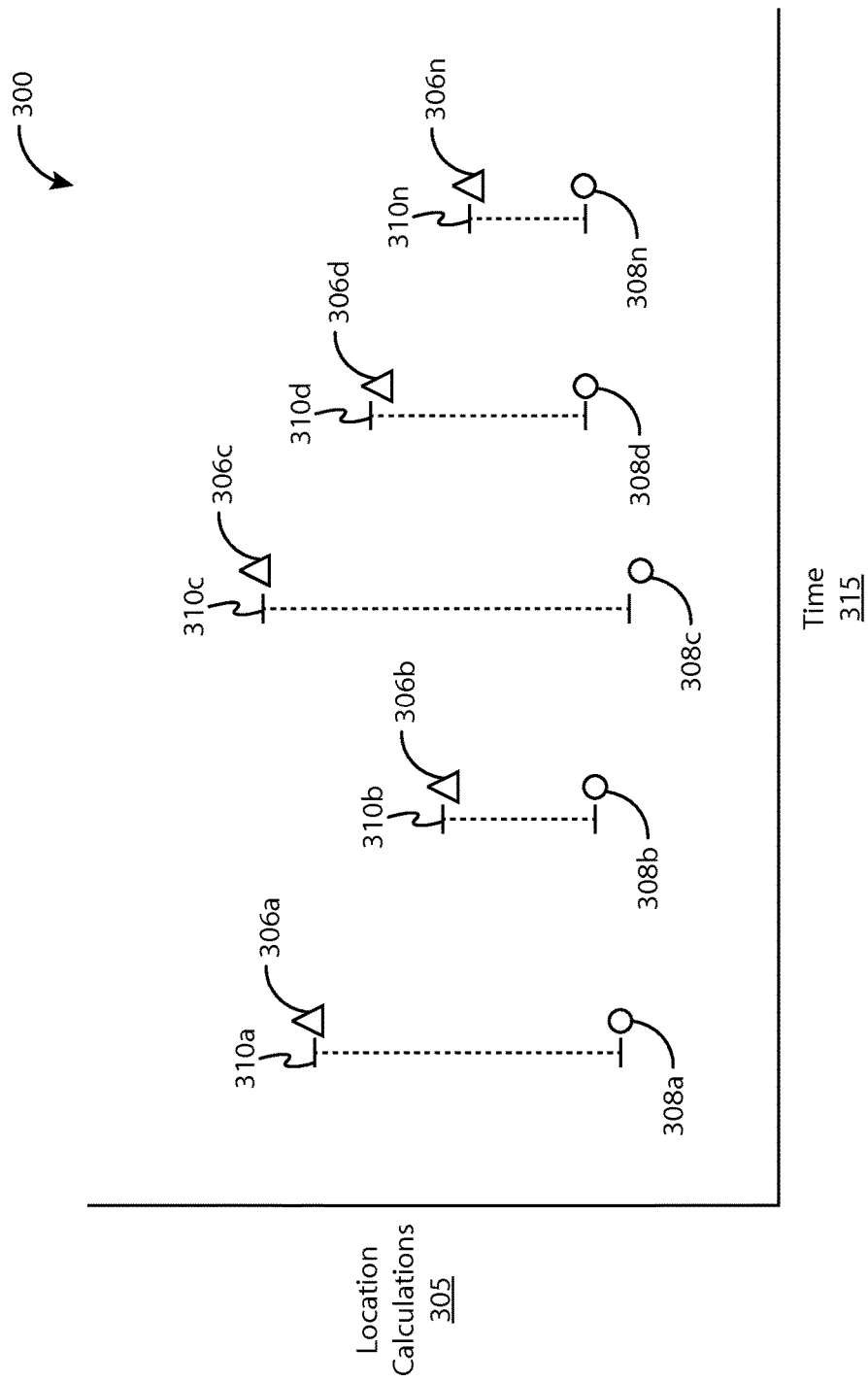
FIG. 3A illustrates a graph that plots location calculations made by the location detection module of FIG. 2 versus time in accordance with an example embodiment of the present invention.

FIG. 3A illustrates an example graph 300 that plots location calculations 305 versus time 315. In particular, the graph 300 includes data points 306a-n that correspond to location calculations 305 made by, for example, the sensor measurements module 211 of FIG. 2. In addition, the graph 300 includes data points 308a-n that correspond to location calculations 305 made by, for example, the sensor estimation module 213 of FIG. 2. Each of the data points 306a-n and 308a-n are associated with respective sensor input samples received from, for example, the sensor(s) 220. An error module (e.g., error module 214 of FIG. 2) determines an error 310 a-n between the location of a remote emitter (e.g., the remote emitter 140a and/or object 140b of FIG. 1) as determined by the sensor measurements module 211 and the sensor estimation module 213 (e.g., a difference between the data points 306a-n and the data points 308a-n).

Figure 3B:
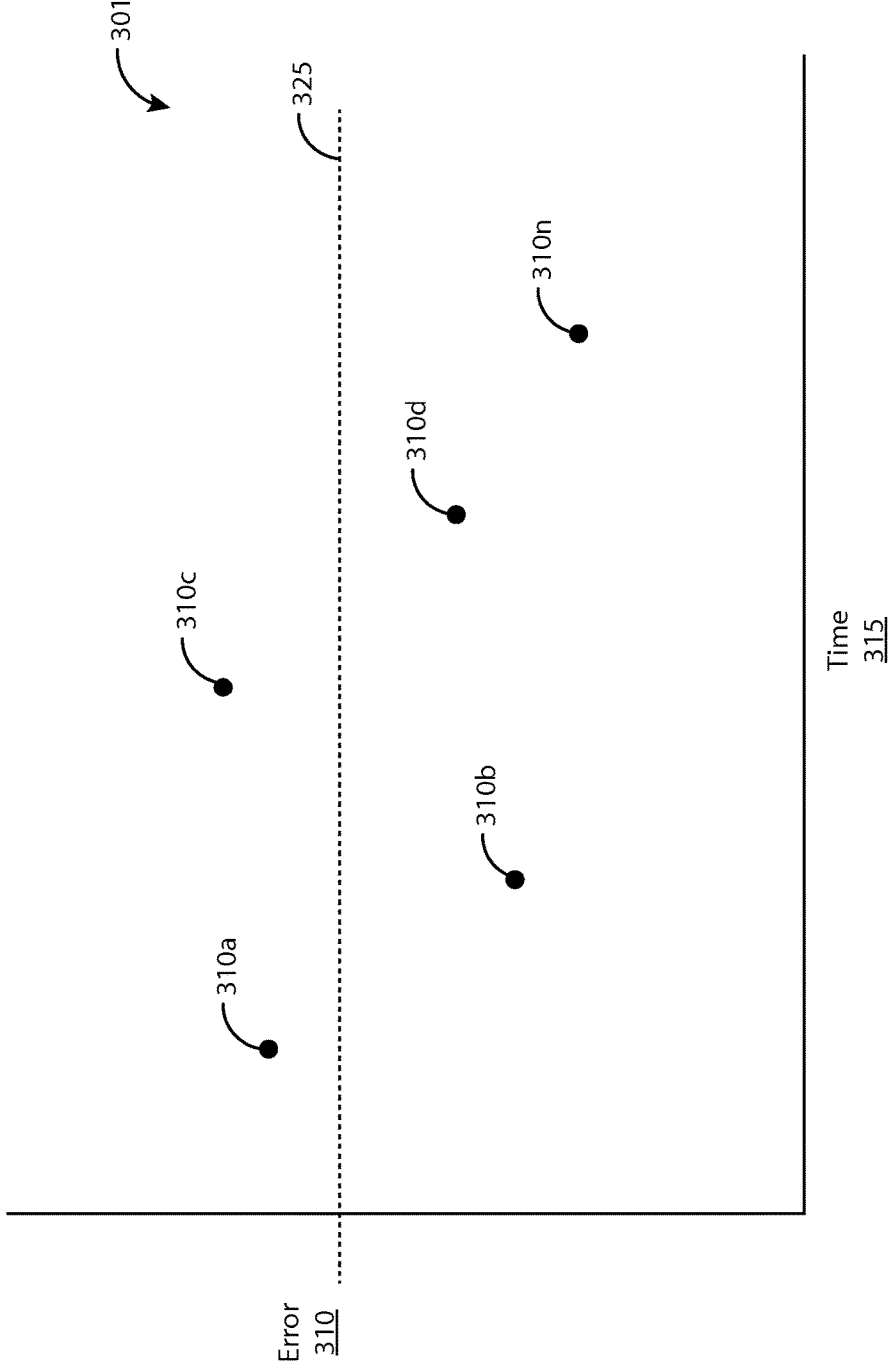
FIG. 3B illustrates a graph that plots error versus a number of points sampled in time.

FIG. 3B illustrates a graph 301 that plots Estimated Location 310 versus time 315. As stated above, the error points 310a-n are determined as the difference between the data points 306a-n and the data points 308a-n of FIG. 3A. In order to mitigate effects of erroneous data due to noise bursts, an error corrective filter (e.g., the error corrective filter 215 of FIG. 2) removes sensor input samples that correspond to the data points 306a-n and 308a-n having an error greater than an error threshold 325. As illustrated, the data point 310a and the data point 310c are above the error threshold 325. Thus, the error corrective filter removes the data points 310a and 310c. By removing the data points 310a and 310c, Kalman filter output is improved as illustrated below with respect to FIG. 4. In an example, the error threshold 325 is a predetermined maximum allowable difference between location calculations 305.

Figure 4:
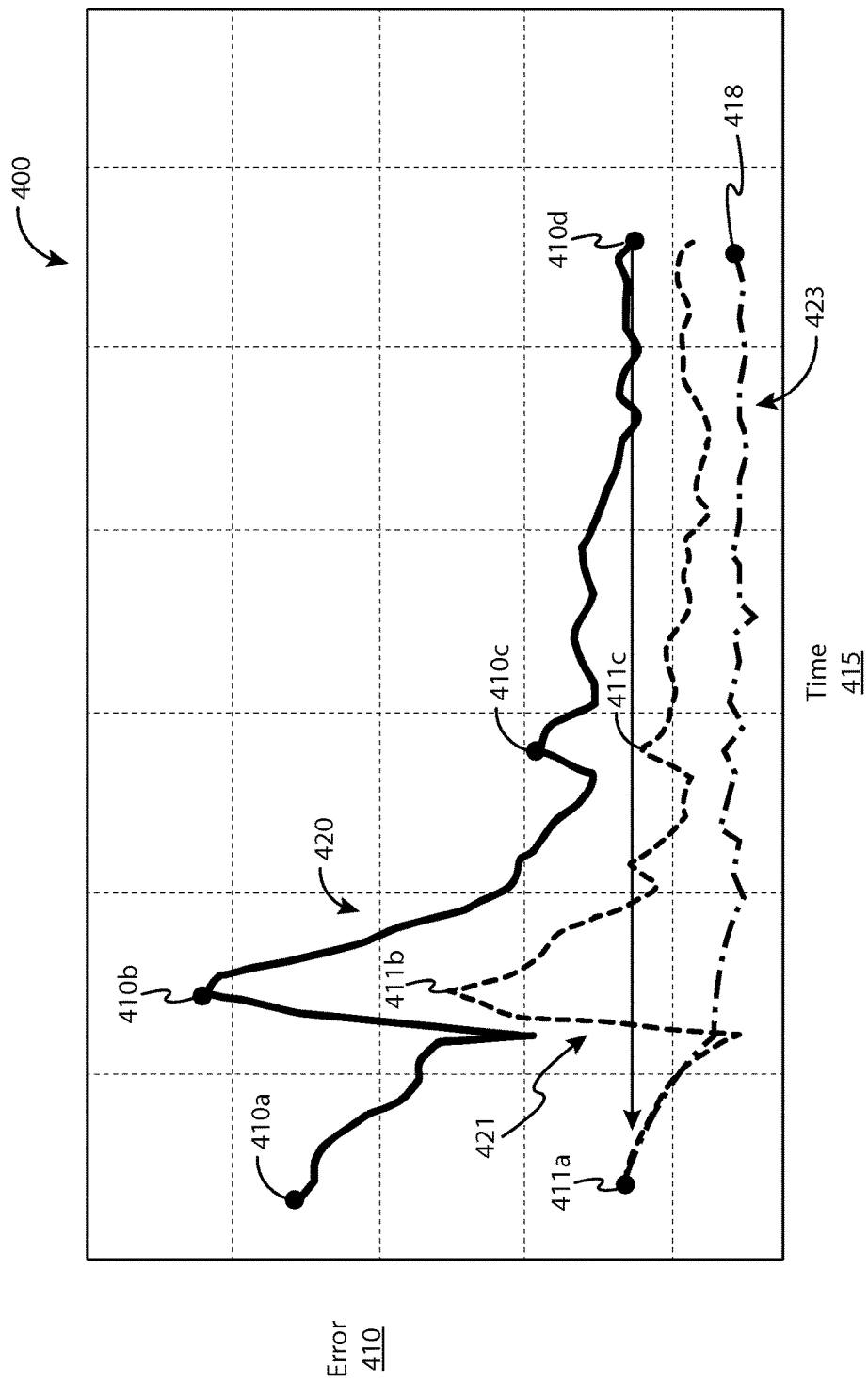
FIG. 4 illustrates another graph that plots error versus a number of points sampled in time, in an exemplary embodiment.

FIG. 4 illustrates an example graph 400 that plots error 410 versus a number of measurements sampled in time 415. In particular, the graph 400 includes plot 420, plot 421, and plot 423. The plot 420 illustrates error reduction between location calculations (e.g., the location calculations of FIG. 3A) versus time 415 using a Kalman filter. For example, the location calculations are made by a sensor measurements module (e.g., the sensor measurements module 236 of FIG. 2) and a sensor output estimator (e.g., the sensor output estimator 245 of FIG. 2). The plot 420 corresponds to an original set of sensor input samples received from, for example, sensor(s) 220 of FIG. 2. As stated herein, Kalman filters fail to converge on an accurate value (e.g., location of a remote emitter) due to noise bursts. In order to mitigate the effect of noise bursts, an error corrective filter (e.g., the error corrective filter 215 of FIG. 2) removes sensor input samples that correspond to location calculations having the greatest error. Plot 421 and plot 423 show the effect on error reduction of a Kalman filter by utilizing the error corrective filter to remove anomalous points having large error.

For example, plot 420 illustrates how error reduction by a traditional Kalman filter at the first few points in time is spoiled by an abrupt increase at two successive anomalous points (e.g., 410a-b). After that, error reduction continues to a plateau. After this, error again increases suddenly at another anomalous point (e.g., 410c). Through a study of empirical evidence, it seems that these error increases appear to result from occasional false data (e.g., noise bursts that are unanticipated) fed into a Kalman filter. For instance, the difference between the location calculations (e.g., the location calculations 305 of FIG. 3A) of a remote emitter (e.g., the remote emitter 140a and/or moving object 140b) increases at points of an introduction of such noise bursts.

If the noisy data causing these error responses were anticipated, it would not pass through the Kalman Filter, and this corruption would be avoided. Thus, the Kalman-filtered estimate would not greatly deviate from the non-filtered estimate of the location of the remote emitter.

In order to prevent a divergence from an accurate estimate, the error corrective filter eliminates a subset of measurements having the largest errors from a data set of measurements and processes the remaining data through a Kalman filter. Advantageously, disclosed embodiments enable a Kalman filter to converge on an accurate value without the introduction of noise boost estimates, which adds processing time and can also add additional sources of error.

For example, in a first pass through of the data associated with the plot 420, the error corrective filter eliminates measurements associated with point 410a. Because the point 410a is eliminated, a location detection module (e.g., the location detection module 200 of FIG. 2) does not have an initial data sample from which to calculate a location of a remote emitter. Thus, for a next pass through, of a Kalman filter the location detection module 200 uses a location solution associated with point 410d as an initial input to a Kalman filter. The result of the next pass through of the Kalman filter after removing point 410 is plot 421. In order to obtain the plot of 423, the error corrective filter eliminates measurements associated with points 411b-c. The plot 423 illustrates a plateau in error reduction by a Kalman filter after all anomalous data points are removed by the error corrective filter. Thus, the location associated with point 418 is determined to be an accurate estimate of the location of the remote emitter.

Figure 5:
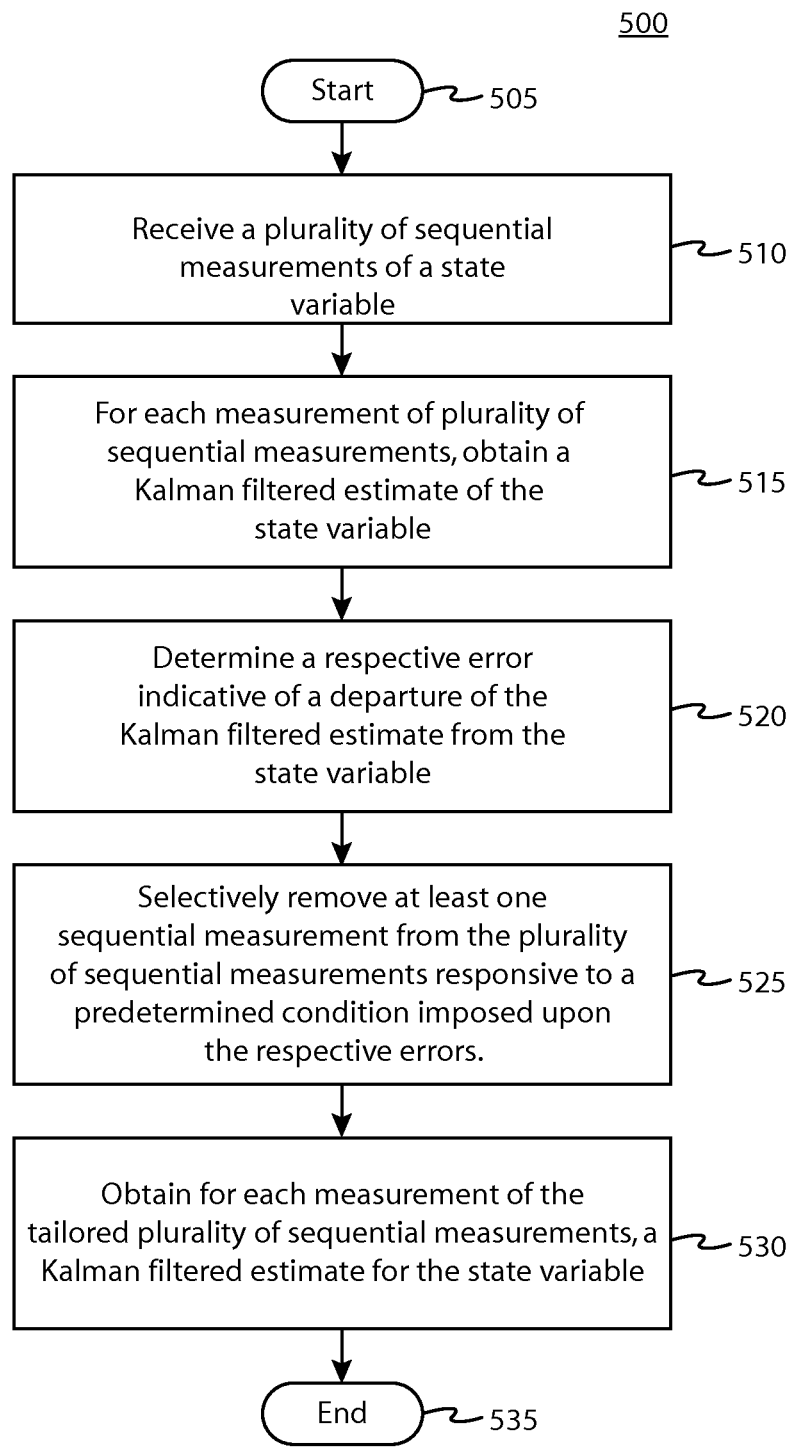
FIG. 5 is a flow diagram of an example method for improving a Kalman filter solution in accordance with an example embodiment of the present disclosure

FIG. 5 is a flow diagram of an example method 500 for improving a Kalman filter solution in accordance with an example embodiment of the present disclosure. At 505, method 500 begins. At 510, method 500 includes receiving a plurality of sequential measurements of a state variable. Each measurement includes a respective noise contribution. The method 500, at 515, includes obtaining for each measurement of the plurality of sequential measurements, a Kalman-filtered estimate of the state variable. At 520, the method 500 includes, for each Kalman-filtered estimate, determining a respective error indicative of a departure of the Kalman-filtered estimate from the state variable. In addition, the method 500, at 525, includes selectively removing at least one sequential measurement from the plurality of sequential measurements responsive to a predetermined condition imposed upon the respective errors. In this case, the sequential measurements remaining after removal are referred to as a tailored plurality of sequential measurements. At 530, method 500 includes obtaining, for each measurement of the tailored plurality of sequential measurements, a Kalman-filtered estimate for the state variable. At 535, method 500 ends.

Figure 6:
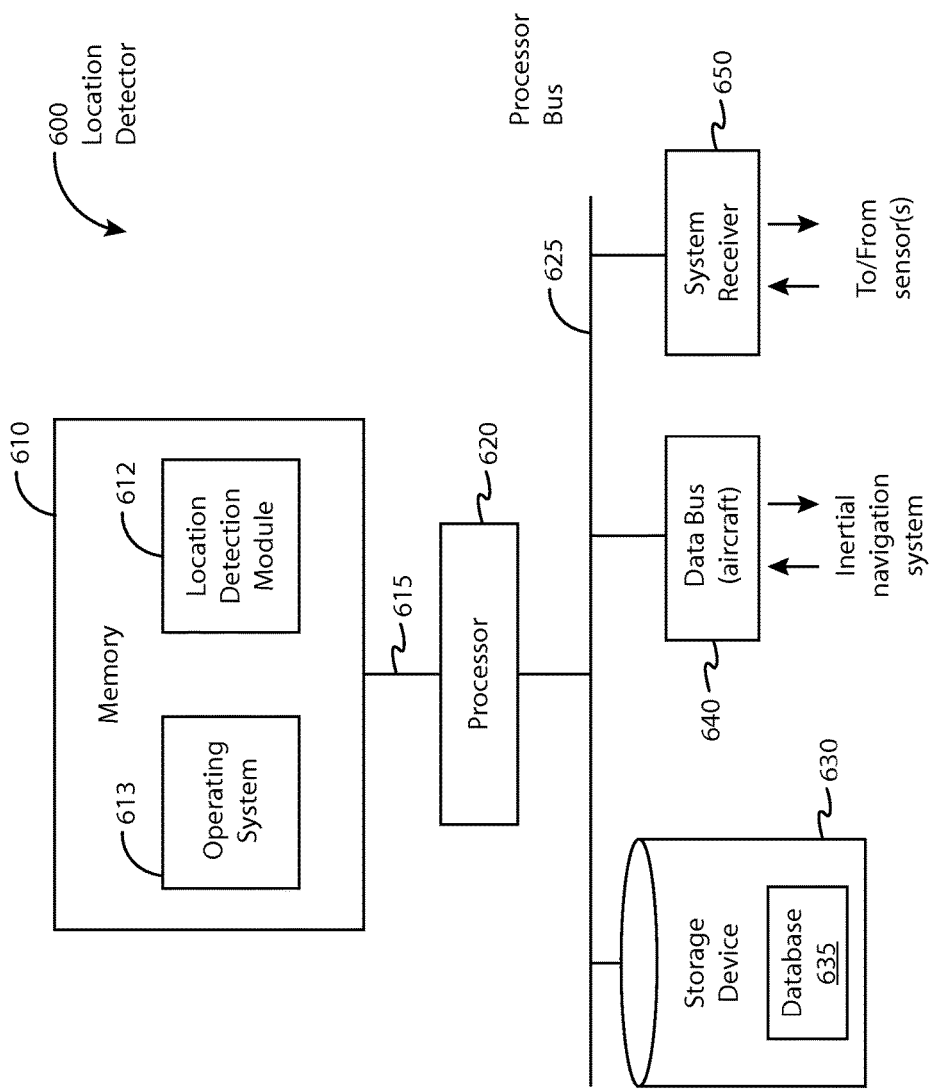
FIG. 6 is a block diagram of a location detector in accordance with an example embodiment of the present disclosure.

FIG. 6 is a block diagram of a location detector 300 that employs a location detection module 612 (e.g., the location detection module 200 of FIG. 2) that can be used in connection with an embodiment of the present disclosure. The location detector 600 includes a memory 610 coupled to a processor 620 via a memory bus 615, and a storage device 630, external data bus 640, and a receiver 650 coupled to the processor 620 via an input/output (I/O) bus 625. It should be noted that the location detector 600 can include other devices, such as keyboards, display units and the like. The receiver 650 and the data bus 640 interfaces the location detector 600 to sensor(s) (e.g., sensors 120a-b of FIG. 1) and an inertial navigation system (e.g., inertial navigation system 130 of FIG. 1) and enables data (e.g., packets) to be transferred between the location detector 600, the sensor(s), and the inertial navigation system. The network interface 640 can include conventional circuitry that incorporates signal, electrical and mechanical characteristics, and interchange circuits to interface with physical media of the sensor(s) and inertial navigation system and protocols running over that media. The storage device 630 is a conventional storage device (e.g., a disk) capable of storing, inter alia, sensor input samples, indications of sensor noise, indications of platform motion, sensor motion noise, and combined indications of sensor noise and sensor motion noise.

The memory 610 is an example non-transitory computer-readable medium, optionally implemented as a RAM employing RAM devices, such as DRAM devices and/or flash memory devices. The memory 610 contains various software and data structures used by processor 620, such as software and data structures used by the processor 620 that implement aspects of the present disclosure. Specifically, the memory 610 can store software configured to serve as an operating system 613 or provide a location detection module 612. The operating system 613 can be used to functionally organize the location detector 600 by invoking operations in support of processes and services executing on the location detector 600, such as location detection module 612. The location detection module 612, as described herein, can include non-transitory computer-executable instructions for determining a location of a remote emitter.

The storage device 630 can include a database 635, which can be implemented in the form of a data structure that is configured to hold various information used for local maxima detection, such as sensor input samples, indications of sensor noise, indications of platform motion, sensor motion noise, and combined indications of sensor noise and sensor motion noise.

Further example embodiments of the present disclosure can be configured using a computer program product; for example, controls can be programmed in software for implementing example embodiments of the present disclosure. Further example embodiments of the present disclosure can include a non-transitory computer readable medium containing instruction that can be executed by a processor, and, when executed, cause the processor to complete methods described herein. It should be understood that elements of the block and flow diagrams described herein can be implemented in software, hardware, firmware, or other similar implementation determined in the future. In addition, the elements of the block and flow diagrams described herein can be combined or divided in any manner in software, hardware, or firmware. If implemented in software, the software can be written in any language that can support the example embodiments disclosed herein. The software can be stored in any form of computer readable medium, such as random access memory (RAM), read only memory (ROM), compact disk read only memory (CD-ROM), and so forth. In operation, a general purpose or application specific processor loads and executes software in a manner well understood in the art. It should be understood further that the block and flow diagrams can include more or fewer elements, be arranged or oriented differently, or be represented differently. It should be understood that implementation can dictate the block, flow, and/or network diagrams and the number of block and flow diagrams illustrating the execution of embodiments of the disclosure.

The teachings of all patents, published applications and references cited herein are incorporated by reference in their entirety.

While this disclosure has been particularly shown and described with references to example embodiments thereof, it will be understood by those skilled in the art that various changes in form and details can be made therein without departing from the scope of the disclosure encompassed by the appended claims.

What is claimed is:

1. A computer-implemented method of determining a Kalman-filtered estimated value of a state variable associated with an object, the method comprising:
   (a) generating, using a processor, a plurality of sequential measurements of the state variable as a function of a corresponding received plurality of sequential sensor input samples detected by one or more sensors at a platform, each state variable measurement including a respective noise contribution;
   (a1) receiving, at the processor, a plurality of sequential platform physical motion and position measurements from a motion sensing device at the platform corresponding to the plurality of sequential sensor input samples;
   (b) generating, using the processor, a plurality of sequential state variable estimates as a function of the plurality of sequential platform physical motion and position measurements and a current Kalman-filtered estimated value of the state variable generated per a Kalman-filtering function;
   (c) generating, using the processor, a plurality of respective errors as a function of a difference between the sequential state variable measurements and the sequential state variable estimates;
   (d) selectively removing, using the processor, at least one sequential state variable measurement and the corresponding platform physical motion and position measurements from the plurality of sequential state variable measurements as a function of a predetermined condition applied to the corresponding respective errors and those remaining sequential state variable measurements defining a tailored plurality of sequential state variable measurements;
   (e) applying, using the processor, the Kalman-filtering function, in sequence, to said tailored plurality of sequential state variable measurements and corresponding platform physical motion and position measurements to update the current Kalman-filtered estimated value of the state variable; and
   (f) repeating steps (c)-(e) using the tailored plurality of sequential state variable measurements and corresponding platform physical motion and position measurements until the Kalman-filtered estimated value has converged,
   whereby the Kalman-filtering function is not applied to the selectively removed at least one sequential state variable measurement in step (f).

2. The computer-implemented method of claim 1, wherein the predetermined condition comprises a comparison of each respective error to an error threshold.

3. The computer-implemented method of claim 1, wherein the predetermined condition comprises a comparison of each respective error to a preset factor of estimated noise.

4. The computer-implemented method of claim 1, wherein the predetermined condition comprises removing a preset percentage of the total number of sequential state variable measurements.

5. The computer-implemented method of claim 1, wherein generating a plurality of sequential measurements of a state variable comprises generating a frequency difference of arrival (FDOA) measurement as a function of the sensor input samples received from at least two spaced apart sensors on the platform.

6. The computer-implemented method of claim 1, wherein generating a plurality of sequential measurements of a state variable comprises generating a time difference of arrival (TDOA) measurement as a function of the sensor input samples received from at least two spaced apart sensors on the platform.

7. A system for determining a Kalman-filtered estimated value of a state variable associated with an object, the system comprising:
- a processor and a non-transitory memory coupled to the processor and storing program instructions that, when executed by the processor, cause the processor to:
  - (a) receive a plurality of sequential sensor input samples detected by one or more sensors at a platform and to generate a plurality of sequential measurements of the state variable as a function of the received sensor input samples, each state variable measurement including a respective noise contribution, and to receive a plurality of sequential platform physical motion and position measurements from a motion sensing device at the platform corresponding to the plurality of sequential sensor input samples and to generate a plurality of sequential state variable estimates as a function of the plurality of sequential platform physical motion and position measurements and a current Kalman-filtered estimated value of the state variable generated per a Kalman-filtering function;
  - (b) store the Kalman-filtered estimated value of the state variable in the memory;
  - (c) a plurality of respective errors as a function of a difference between the sequential state variable measurements and the sequential state variable estimates; and
  - (d) selectively remove at least one sequential state variable measurement and the corresponding platform physical motion and position measurements from the plurality of sequential state variable measurements as a function of a predetermined condition applied to the corresponding respective errors and those remaining sequential state variable measurements to define a tailored plurality of sequential state variable measurements;
  - (e) apply the Kalman-filtering function, in sequence, to the tailored plurality of sequential state variable measurements and corresponding platform physical motion and position measurements to update the current Kalman-filtered estimated value of the state variable; and
  - (f) iteratively process the tailored plurality of sequential state variable measurements and corresponding platform physical motion and position measurements by repeating steps (c)-(e) until the Kalman-filtered estimated value has converged,
- whereby the Kalman-filtering function is not applied to the selectively removed at least one sequential state variable measurement in step (f).

8. The system of claim 7, wherein the predetermined condition comprises a comparison of each respective error to a preset factor of estimated noise.

9. The system of claim 7, wherein the predetermined condition comprises removing a preset percentage of the total number of sequential state variable measurements.

* * * * *